Nov. 18, 1952　　　A. R. EDWARDS　　　2,618,126
COMBINATION TEMPERATURE CONTROL AND ILLUMINATING
LIGHT CONTAINER FOR REFRIGERATOR CABINETS
Filed May 5, 1950　　　2 SHEETS—SHEET 1

Inventor:
A. R. Edwards
Paul O. Pippel
Atty.

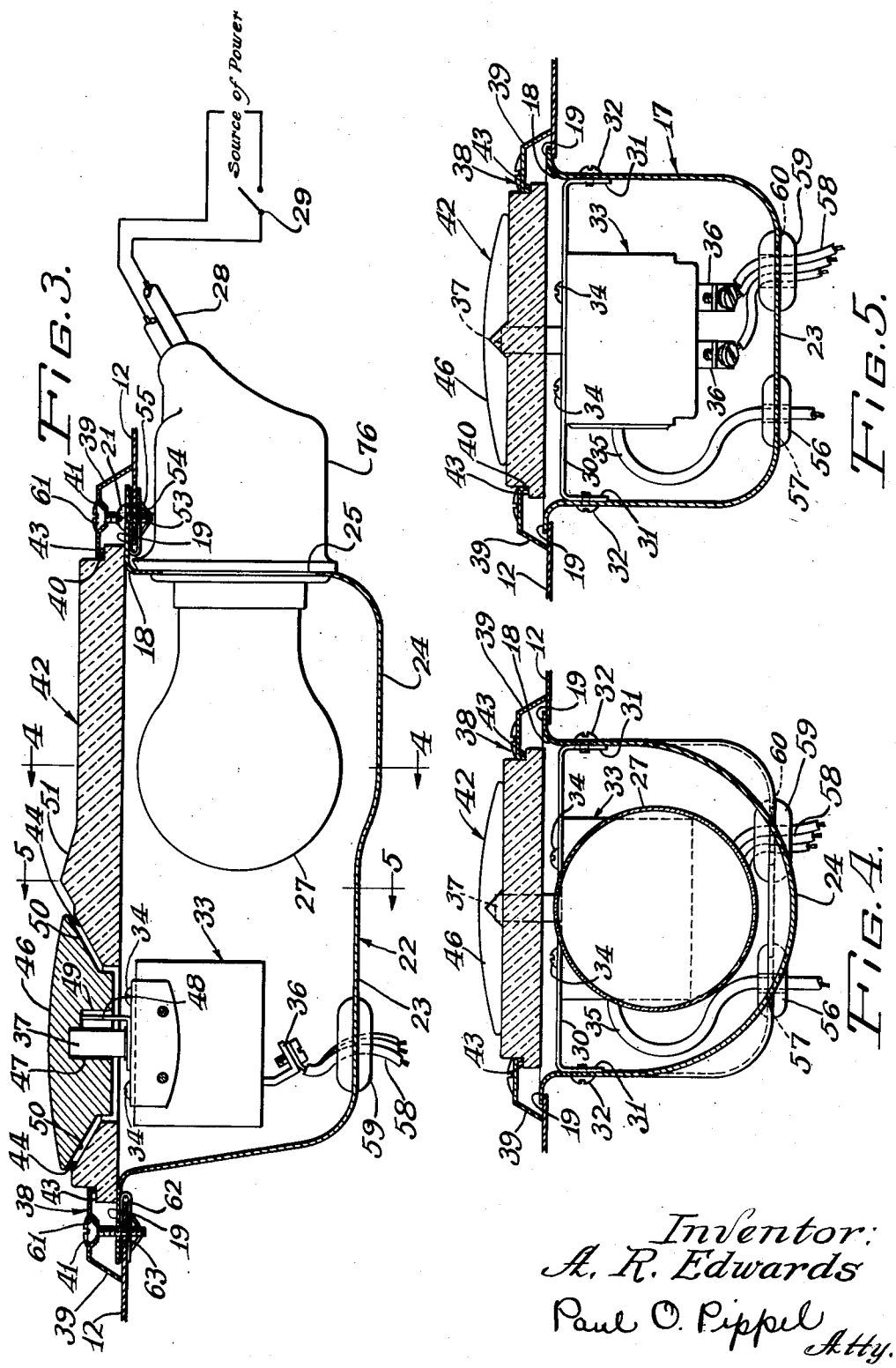

Patented Nov. 18, 1952

2,618,126

UNITED STATES PATENT OFFICE 2,618,126

COMBINATION TEMPERATURE CONTROL AND ILLUMINATING LIGHT CONTAINER FOR REFRIGERATOR CABINETS

Arthur R. Edwards, Evansville, Ind., assignor to International Harvester Company, a corporation of New Jersey Application May 5, 1950, Serial No. 160,368

6 Claims. (Cl. 62—2)

This invention relates to refrigerating apparatus, but more particularly to the temperature control and illuminating devices employed in connection with refrigerator cabinets. Heretofore it was customary to mount the temperature control device, for a refrigerated storage compartment of a refrigerator cabinet, in the wall insulation close to the rear thereof and then, by means of a long rod or linkage, connect this control switch with a manual control knob positioned convenient to the user at the front of the cabinet. More recently, however, it has been the preferred practice to position the temperature control switching device immediately behind the manual control knob and then to mount the assembly in one wall of the refrigerated storage compartment so that the control knob is readily available for adjustment when the door to the compartment is opened. This arrangement, while it represents an improvement over prior practices, introduces new problems which the present invention effectively overcomes. Locating the temperature control switch mechanism immediately behind the control knob necessitates the positioning of the assembly in close proximity to the cold refrigerated temperatures prevailing in the food storage compartment. It has been found that a device of this character when operated in such an atmosphere has a pronounced tendency to collect condensate, and sometimes frost, on the exterior thereof which, in turn, changes the ambient temperature of the device and subsequently interferes with its normal functioning in response to temperature changes in the evaporator area. The present invention, therefore, is directed to the provision of means for reducing the formation and collection of condensate or frost in and around a temperature control device when such device is so located in a refrigerator cabinet as to make it readily susceptible to undesirable accumulations of frost or condensate. It is a principal object of this invention, therefore, to provide a simple, yet improved, means for preventing condensate or frost from forming on a temperature control device and thereby interfering with the normal functioning of such device in a refrigerator cabinet.

Another object is to provide an arrangement wherein the temperature control device in a refrigerator cabinet may be mounted in thermal association with an incandescent lamp which is additionally adaptable for illuminating the interior of the cabinet.

A further object is to provide a container, suitable for fixedly positioning in the interior wall of a refrigerator cabinet, that is adaptable for mounting an incandescent illuminating lamp and a temperature control device in heat exchange relation therein.

A still further object is to provide an improved means for preventing the mal-functioning of a temperature control device in a refrigerator cabinet because of the exposure of said device to undesirable reduced temperatures.

Another important object is to provide a simplified means for mounting an incandescent illuminating light and a temperature control device in close proximity to one another in a unitary container.

A further important object is to provide a unitary container, suitable for mounting in an interior wall of a refrigerator cabinet, that has a temperature control device positioned in heat exchange relation with an incandescent illuminating light, and in which means are provided for directing the rays from the light throughout the interior of the cabinet.

The foregoing and other objects and features of the invention will become apparent as the disclosure is more fully made in the following detailed description of a preferred embodiment of the invention as illustrated in the accompanying sheets of drawings in which:

Fig. 3 is a longitudinal section taken on line 3—3 of Fig. 2, but having certain portions shown in plan view for the purpose of simplification of the figure.

Fig. 4 is a transverse section taken on line 4—4 of Fig. 3, but having certain portions shown in plan view for the purpose of simplification of the figure.

Fig. 5 is a transverse section similar to Fig. 4, but taken on line 5—5 of Fig. 3.

Figure 1:
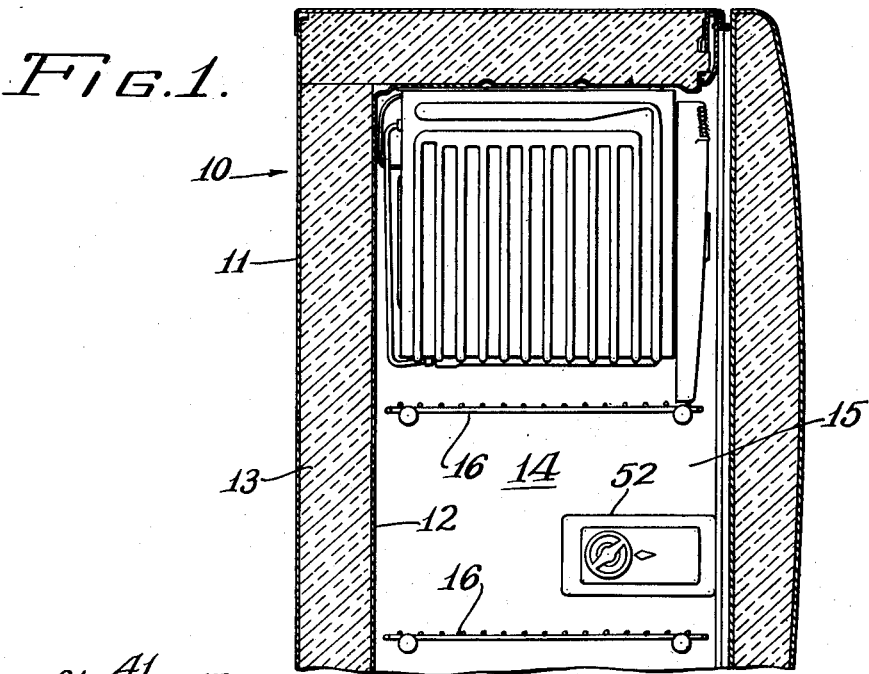
Fig. 1 is a partial sectional view of a conventional refrigerator wherein the present invention has been shown incorporated in one side wall thereof.
Figure 2:
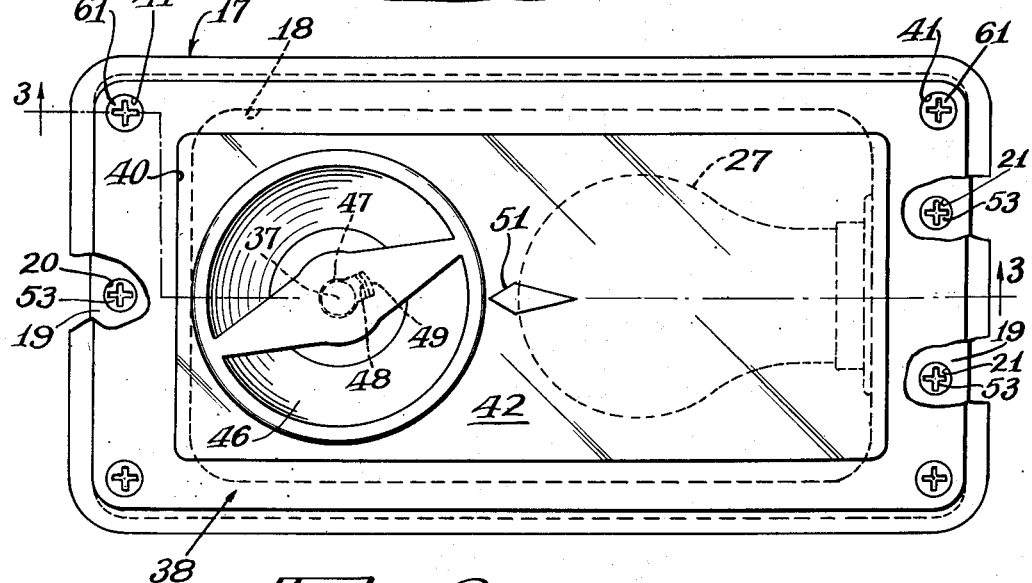
Fig. 2 is a top plan view, with portions broken away, of an assembled device that includes the present invention.

Referring specifically to Fig. 1 of the drawings, which shows a partial sectional view of one embodiment of the invention, it will be noted that the conventional refrigerator cabinet 10 illustrated includes an outer shell 11, and an inner shell 12, spaced therefrom by suitable insulation material 13, with the inner shell arranged to provide a food storage compartment 14 therewithin. One interior wall of the cabinet is indicated by the numeral 15 while conventional vertically spaced shelving is shown by the numeral 16. Since the refrigerant compressing apparatus forms no particular part of the present invention, and since any of the conventional types may be used, the details thereof have not been shown.

A container 17, fashioned preferably of some metallic material and substantially oblong in shape, is formed with an opening 18 in one side thereof, and with a peripherally extending flange 19 that extends outwardly from the marginal edges thereof. Openings 20 and 21 along opposite sides of said flange are provided for purposes which will be more fully explained hereinafter. The bottom 22 of said container is fashioned, preferably so as to provide a substantially flat portion 23 that flairs into a contiguous curved cup-like portion 24. An opening 25 in the end of the container nearest the curved bottom portion is provided for the purpose of mounting a conventional weather-resisting rubber encased electric light socket 26 therein, which socket, in turn, receives an incandescent illuminating light 27. Electric wires 28, from the socket 26, may be connected through a conventional door operating switch 29, to any convenient source of electric power, such as, for instance, that which operates the refrigerant compressor and which, for purposes of this invention, need not be shown in detail. It will be noted that the electric light 27, when positioned in its socket 26, lies adjacent the curved portion of the bottom of the container in such manner that said cup-like portion may function as a reflector for the rays from the light. If desired, of course, the interior surface of said reflecting portion may be polished to increase its reflecting properties.

A tranverse member 30, having downwardly turned end flange portions 31, on opposite ends thereof, is positioned between opposite sides of the container 17, with the outer faces of said flanges abutting the inner surfaces of the sides, and secured thereto by any suitable means such as the screws 32. Although the top plane of the member 30, as illustrated, is spaced slightly below that of the peripheral flange 19, such spacing is not essential to the concept of this invention.

A conventional temperature control device, indicated generally by the numeral 33, is supported from the member 30 by suitable means such as the screws 34. In the illustrated embodiment the temperature control device shown is a conventional Type A Unit manufactured by Ranco Inc. and contains the usual thermostatically controlled electric switch which operates to open or close the electric circuit supplying power to a refrigerant motor-compressor unit. A small diametered conduit 35 connects the switch mechanism with a control bulb usually positioned adjacent the refrigerant evaporator, while the electrical connections for the electric switch mechanism may be made to terminals 36 on the casing thereof. A shaft 37, projecting from one side of said device, is usually provided to permit manual adjustment and control of the switch without having to get into the interior of the device. The use and operation of such devices is, of course, well understood in the art; hence the specific construction thereof need not be further detailed. For the purposes of the present invention any one of several similar devices now on the market may be used without deviating from the concept of the invention.

An escutcheon-like cover frame 38, shaped to conform substantially with that of the outline of the container but somewhat larger so as to provide edges 39 that will overlie the container flange 19, is fashioned with a rectangular opening 40 in the center of the frame and a circular opening 41 in each corner thereof.

A translucent, plate-like cover is fabricated to conform substantially with that of the opening in the container but slightly larger in longitudinal dimension in order to provide peripherally extending ledge or shoulder portions 43 that may overlie the transverse peripheral flange 19 in said container. When the frame 38 is positioned over said cover the ledge 43 will abut the inner face of the frame adjacent its rectangular opening and a portion of said cover will project out beyond the plane of the frame, thus the cover will be fixedly positioned against endwise movement within the frame. One end portion of the cover 42 has a circular opening therein that is provided with a beveled edge 44, while the opposite end portion of said cover is flat and clear and hence is effective for transmitting light rays from the illuminating lamp 27 therethrough. It will be understood, of course, that the flat, clear portion of the cover, when positioned over the container opening will be disposed adjacent the light so that it may cooperate with the reflector in the bottom of the container for projecting and diffusing light rays throughout the interior of the refrigerated compartment of the cabinet.

The control shaft 37, extending out of the temperature control device, passes loosely through an opening 45 in the member 30, and through the opening in the cover plate where a control knob 46 having a central opening 47 therein may be mounted thereon. Although any suitable means may be used for mounting this knob on the shaft, in the unit illustrated herein one end of a flat spring member 48, the opposite end of which is affixed to the shaft for rotation therewith, is adapted to fit into a slotted recess 49 in said knob, thus operating to hold the knob securely in place, and at the same time providing means for turning the shaft by rotating the knob. The control knob 46 may be further provided with a tapered edge 50 that is adapted to mate in slightly spaced relationship with the beveled edge 44 of the opening in the cover thus serving to fill the opening and to present a pleasing appearance. Gradation markings (not shown) on the outside of the control knob may be provided to cooperate with a marker 51 on the cover in order to facilitate manual adjustment in predetermined degrees of said temperature control device.

The container 17 preferably is mounted in a recess 52 in a wall of the refrigerated compartment. Although the illustration shows it as being mounted in the side wall of a cabinet, it will be understood that such specific location is only illustrative and not limiting. A suitable means for securing the container in the wall includes the use of self-tapping screws 53 that pass through openings 20 and 21 in the opposite sides of the peripheral flange 19, and then are held in place in openings 54 in the inner shell of the cabinet by means of speed nuts 55.

The temperature control device may be connected to a conventional control bulb (not shown) by means of the tube or conduit 35 which passes through a grommet 56 positioned in an opening 57 in the bottom of the container. Electrical connections 58 from the control mechanism to a refrigerant compressor unit may be passed through a grommet 59 positioned in an opening 60 in the bottom of the container.

In assembling the unit the temperature control device 33 is fixedly positioned in the container and the connections then made to the control bulb and refrigerant compressor (neither of which has been shown). The container may then be positioned in the recess 52 in the cabinet wall and secured therein by means of the self-tapping screws 53 and the speed nuts 55. With the container in place the cover 42 and cover frame 38 may next be positioned and secured in place by means of the screws 61 and speed nuts 62 positioned around openings 63 in the inner wall 12 in alignment with openings 41 in the frame. The control knob 46 may be slipped over the shaft 37 at the same time that the spring 48 is inserted into the slotted recess 49 therein.

In operation the proposed invention is more or less conventional in so far as its usual functions are concerned. The temperature control device operates, as a result of motivation from the control bulb, to open and close the electrical circuit that supplies power to the refrigerant compressor and thus starts the compressor when needed and shuts it down when the refrigeration load no longer requires its operation. The electric light is turned on or off by the door switch which makes contact when the door is opened and thus lights the light and breaks the contact when the door is closed. However, in accordance with the teachings of the present invention when the door is opened and the electric light is illuminated the heat incidentally resulting from the operation thereof is effective for heating the interior of the container and thus raising the ambient temperature of the temperature control device. In this manner any frost or condensate that might form on this device during the inoperative period of the light is rapidly evaporated, as a result of the increased temperature of the container, and the temperature control device continues to operate in response only to changes originating in the control bulb.

From the foregoing it will be apparent that a highly effective arrangement, which may be fabricated at a very reasonable cost, has been provided for combining a refrigerator cabinet illuminating light in the same container with a temperature control device whereby the incidental heat resulting from the operation of the light may be utilized to minimize condensate and frost accumulations in and around the temperature control device, which, if not otherwise reduced, would interfere with the proper functioning of said device.

Although only a preferred form of the invention has been illustrated, and that form described in detail, it will be apparent to those skilled in the art that various modifications may be made therein without departing from the spirit of the invention or from the scope of the appended claims.

What is claimed is:

1. In a refrigerator cabinet having a refrigerated compartment, the combination of a container having an opening therein and mounted in one wall of the compartment, a translucent cover for the opening of said container, a temperature control device mounted in said container, an incandescent illuminating light mounted in said container and adapted for illuminating the interior of the compartment, said light being mounted in thermal association with said temperature control device so that the heat incidentally resulting from the operation of said light is utilized to maintain the ambient temperature of said control device above the temperature of the refrigerated compartment, and an electric circuit for said light.

2. In a refrigerator cabinet, the combination of a container having an opening in one side thereof and adapted for mounting in one wall of the cabinet, a translucent cover for positioning over the opening of said container, a temperature control device mounted in said container, means including an incandescent light for illuminating the interior of said cabinet and for heating the interior of said container when said light is electrically connected to a source of electric power thereby maintaining the ambient temperature of the control device above the temperature of the compartment, and an electric circuit for said light.

3. In a refrigerator cabinet having a refrigerated compartment, the combination of a container having an opening in one side thereof and fashioned with a bottom having a flat portion and a curved portion contiguous therewith that provides a reflecting surface for light beams, said container being adapted for mounting in a wall of said compartment, a translucent cover for covering the opening of said container, a temperature control device mounted in said container with the control therefor projecting through said cover, an incandescent illuminating light mounted in said container adjacent the curved bottom portion thereof and in close proximity to said control device and adapted for illuminating the interior of said compartment, said light being additionally adapted for supplying heat when the light is in operation to the exterior of said control device, and an electric circuit for said light.

4. In a refrigerator cabinet having a refrigerated compartment, the combination of a container having an opening in one side thereof and having a bottom with a flat portion contiguous with a curved portion fashioned to provide a reflecting surface for light beams, said container being adapted for mounting in the compartment, a translucent cover for positioning over the opening in said container, a temperature control devide mounted in said container, an incandescent illuminating light mounted in said container proximate the reflecting surface therein and adapted for illuminating the interior of said compartment, said light being positioned in said container in close proximity to said control device whereby the heat incidentally resulting from the operation of said light is utilized for maintaining the temperature of the interior of the container above the temperature of the compartment, and an electric circuit for said light.

5. In a refrigerator cabinet having a refrigerated compartment, the combination of a container having an opening therein and adapted for mounting in a wall of said compartment, a translucent cover having an opening in one portion thereof, said cover being adapted for positioning over the opening in said container, a temperature control device adapted for mounting in the container and having a manually operable control member that projects through the opening in said cover, an incandescent illuminating light for illuminating the interior of the compartment and mounted in the container in heat exchange relation with the control device whereby the heat resulting from the operation of said light is effective in maintaining the ambient temperature of said control device above the temperature of the refrigerated compartment, and an electric circuit for said light.

6. A heat exchanger unit adapted for mounting in heat exchange relation with the refrigerated compartment of a refrigerator cabinet comprising: a container having an opening in one side thereof; a translucent cover for positioning over the opening in said container; a refrigerant temperature control device mounted in said container; means including an incandescent light for illuminating the interior of the refrigerator cabinet, and for heating the interior of said container when said light is electrically connected to a source of electrical energy whereby the ambient temperature of the control device is maintained above the temperature of the refrigerated compartment; and an electric circuit for said light.

ARTHUR R. EDWARDS.

REFERENCES CITED

The following references are of record in the file of this patent:

UNITED STATES PATENTS

| Number | Name | Date |
|---|---|---|
| 1,433,061 | Avery | Oct. 24, 1922 |
| 2,060,774 | Zurcher | Nov. 10, 1936 |
| 2,129,474 | Money | Sept. 6, 1938 |
| 2,200,801 | Money | May 14, 1940 |
| 2,234,474 | Higham | Mar. 11, 1941 |
| 2,385,525 | McCloy | Sept. 25, 1945 |
| 2,488,161 | Benson | Nov. 15, 1949 |